(12) United States Patent
Boda et al.

(10) Patent No.: US 8,451,853 B2
(45) Date of Patent: May 28, 2013

(54) METHOD AND APPARATUS FOR SELECTING A RECEIVER IN AN ELECTRONIC DEVICE

(75) Inventors: Peter Pal Boda, Palo Alto, CA (US); Zhigang Liu, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 523 days.

(21) Appl. No.: 12/609,940

(22) Filed: Oct. 30, 2009

(65) Prior Publication Data

US 2011/0103353 A1 May 5, 2011

(51) Int. Cl.
*H04L 12/56* (2006.01)
*H04J 1/16* (2006.01)

(52) U.S. Cl.
USPC ............ 370/419; 370/252; 370/329; 370/386

(58) Field of Classification Search
USPC .................................. 370/252, 419, 386, 329
See application file for complete search history.

(56) References Cited

U.S. PATENT DOCUMENTS

| 2003/0195413 A1* | 10/2003 | Rubin et al. ................... 600/411 |
| 2006/0256074 A1* | 11/2006 | Krum et al. .................... 345/156 |
| 2007/0264976 A1 | 11/2007 | Lessing et al. |
| 2008/0150804 A1* | 6/2008 | Kalliola et al. ............... 342/443 |
| 2011/0070837 A1* | 3/2011 | Griffin et al. ................. 455/41.3 |

FOREIGN PATENT DOCUMENTS

EP 1104143 A2 5/2001

OTHER PUBLICATIONS

Sherwood, James, http:www.reghardward.co.uk/2007/11/20/sony_ericsson_patent_data_transfer/, Nov. 20, 2007, 2 pages.

* cited by examiner

*Primary Examiner* — John Pezzlo
(74) *Attorney, Agent, or Firm* — Harrington & Smith

(57) ABSTRACT

In accordance with an example embodiment of the present invention, a method comprises identifying at least one receiver, selecting said at least one receiver by moving an apparatus according to at least one predetermined movement and sending data to said selected at least one receiver.

26 Claims, 6 Drawing Sheets

METHOD AND APPARATUS FOR SELECTING A RECEIVER IN AN ELECTRONIC DEVICE

TECHNICAL FIELD

The present application relates generally to a method and apparatus for selecting a receiver.

BACKGROUND

Electronic devices such as portable communications devices, personal computers, mobile phones, personal digital assistants (PDAs), and Global Positioning System (GPS) receivers often communicate with other devices and peripheral equipment over a relatively short range. A short range channel may utilize one or more wireless methods such as near field communication, short range radio (Bluetooth™) or wireless local area network (WLAN) for communicating and sharing information.

SUMMARY

Various aspects of examples of the invention are set out in the claims.

According to a first aspect of the present invention, a method comprises identifying at least one receiver, selecting at least one receiver by moving an apparatus according to at least one predetermined movement, and sending data to the at least one selected receiver.

According to a second aspect of the present invention, a method comprises identifying at least one receiver, selecting at least one receiver by drawing at least one mark using a display from an apparatus display representation to at least one receiver display representation and sending data to the selected at least one receiver.

According to a third aspect of the present invention, an apparatus comprises at least one motion sensor, at least one processor and at least one memory including computer program code, the at least one memory and the computer program code configured with the at least one processor and the at least one motion sensor to cause the apparatus to perform at least the following: identify at least one receiver, receive an indication of movement of said apparatus from said at least one motion sensor, select at least one receiver based at least in part on said indication of movement of said apparatus, and send data to said selected at least one receiver.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1A:
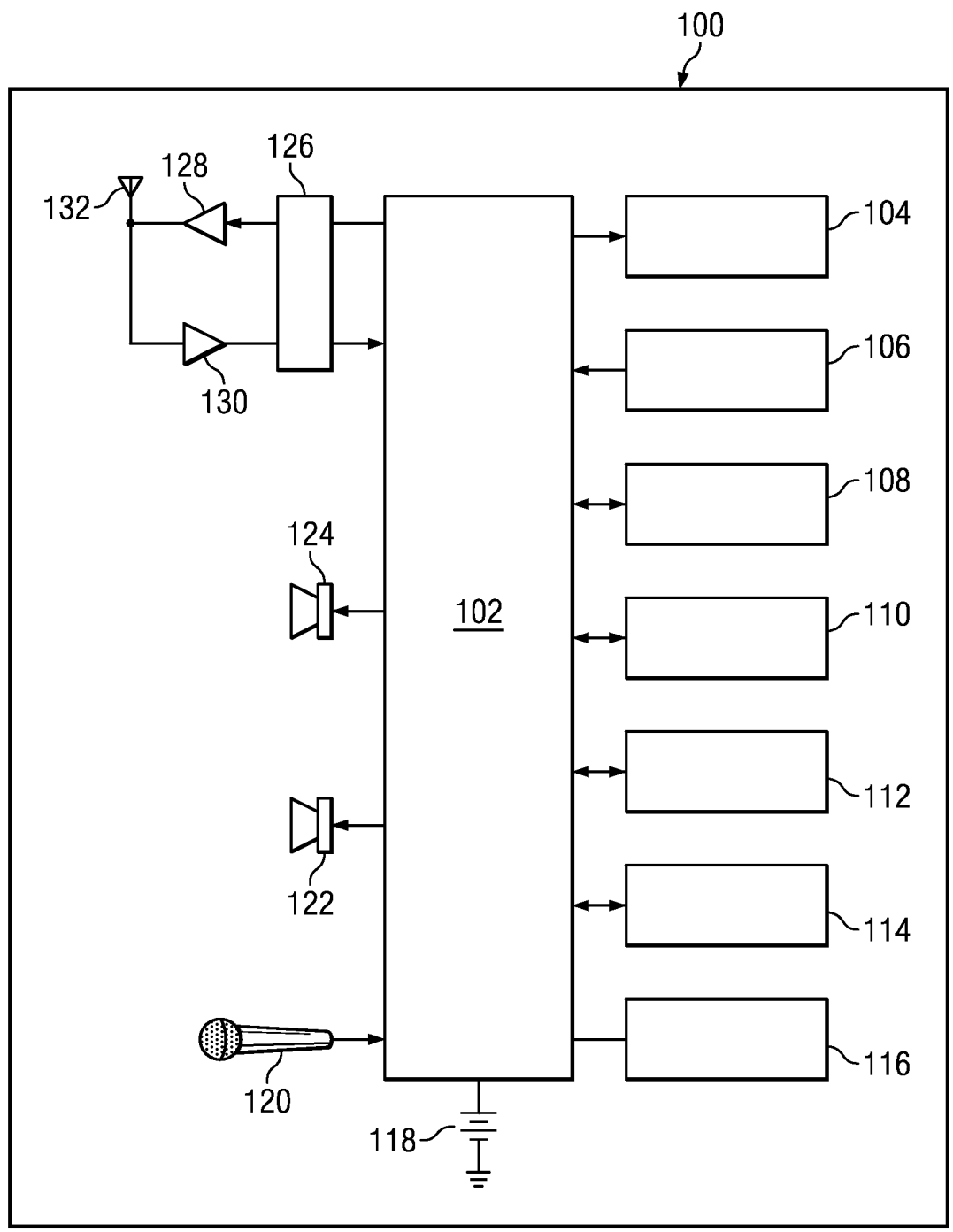
FIG. 1A is a block diagram of an apparatus according to an example embodiment of the invention.

FIG. 1A is a block diagram of an apparatus such as apparatus 100 according to an example embodiment of the invention. In FIG. 1, apparatus 100 comprises at least one antenna 132 to communicate with a transmitter 128 and a receiver 130. Transmitter 128 and/or receiver 130 are connected with a network interface 126 for transmitting and receiving data with electronic devices. Apparatus 100 comprises at least one processor such as processor 102 and may comprise at least one other processing component. Processor 102 provides at least one signal to the transmitter 128 and receives at least one signal from receiver 130. Apparatus 100 further comprises a user interface that includes at least one input and/or output device coupled with processor 102, such as a conventional earphone or speaker 122, a ringer 124, a microphone 120, a display 104, a keypad 106 and/or the like. Apparatus 100 may comprise any type of display such as but not limited to a touch screen display, a near-eye display and/or the like.

In an example embodiment, the apparatus 100 further comprises a battery 118, such as a vibrating battery pack for powering various circuits to operate apparatus 100. Apparatus 100 further comprises a location determining unit (LDU) 116. Location determining unit (LDU) 116 may comprise a Global Positioning System (GPS) receiver for receiving a geographic location of apparatus 100. Apparatus 100 may further comprise a user identity module (UIM) 108. For example, UIM 108 may be a memory device comprising a processor. The UIM 108 may comprise, for example, a subscriber identity module (SIM), a universal integrated circuit card (UICC), a universal subscriber identity module (USIM), a removable user identity module (R-UIM), and/or the like. Further, the UIM 108 may store at least one information element related to a subscriber, such as a mobile subscriber. Apparatus 100 comprises a motion detection unit such as MDU 114. In an example embodiment, MDU 114 comprises at least one motion sensor of any type including but not limited to an accelerometer, a camera, a magnetometer, a gyroscope and/or the like. It should be understood that MDU 114 may comprise and/or communicate with a remote motion sensor such as a wireless motion band. In an example embodiment, a motion sensor is a device used to measure motion, motion direction, acceleration and/or rotation of an apparatus. In an example embodiment, a wireless motion band comprises at least one motion sensor and may be worn on a part of the human body.

The apparatus 100 further comprises at least one memory such as volatile memory 110 and/or a non-volatile memory 112. Volatile memory 110 may comprise a cache area for the temporary storage of data. Apparatus 100 further comprises non-volatile memory 112, which may be embedded and/or removable. The non-volatile memory 112 may further comprise an electrically erasable programmable read only memory (EEPROM), flash memory, and/or the like. In an embodiment, apparatus 100 may use memory to store at least one piece of information and/or data to implement one or more features of apparatus 100. Further, the memory may further comprise an identifier, such as international mobile equipment identification (IMEI) code, capable of uniquely identifying apparatus 100. For example, the processor 102, using the stored instructions, may determine an identity, e.g., using cell identification information. LDU 116 may use cell identification information to determine a geographic location for apparatus 100.

Processor 102 of apparatus 100 may comprise circuitry for implementing audio features, logic features, and/or the like. For example, the processor 102 may comprise a digital signal processor device, a microprocessor device, a digital to analog converter, other support circuits, and/or the like. Further, the processor 102 may comprise features to operate one or more software programs. For example, the processor 102 may be capable of operating a software program for connectivity, such as a conventional Internet browser. Further, the connectivity program may allow the apparatus 100 to transmit and receive Internet content, such as email messages, text messages, SMS messages, MMS messages, location-based content, web page content, and/or the like. Further, processor 102 is capable of executing a software program for determining motion and rotation of apparatus 100 and displaying information related information for the user.

In an example embodiment, the apparatus 100 is capable of operating in accordance with any of a number of a first generation communication protocol, a second generation communication protocol, a third generation communication protocol, a fourth generation communication protocol, and/or the like. For example, the apparatus 100 may be capable of operating in accordance with second generation (2G) communication protocols IS-136, time division multiple access (TDMA), global system for mobile communication (GSM), IS-95 code division multiple access (CDMA), and/or the like. Further, the apparatus 100 may be capable of operating in accordance with third-generation (3G) communication protocols, such as Universal Mobile Telecommunications System (UMTS), CDMA2000, wideband CDMA (WCDMA), time division-synchronous CDMA (TD-SCDMA), and/or the like. Further, the apparatus 100 may also be capable of operating in accordance with 3.9 generation (3.9G) wireless communication protocols, such as Evolved Universal Terrestrial Radio Access Network (E-UTRAN) and/or the like, or wireless communication projects, such as long term evolution (LTE) and/or the like. Further, the apparatus 100 may be capable of operating in accordance with fourth generation (4G) communication protocols.

In an example embodiment, apparatus 100 is capable of operating in accordance with a non-cellular communication mechanism. For example, apparatus 100 may be capable of communication using at least one communication technique such as WLAN, Bluetooth™, RFID, Infrared and/or the like. For example, the apparatus 100 may communicate using one or more of the following WLAN techniques: IEEE 802.11, e.g., 802.11a, 802.11b, 802.11g, 802.11n, and/or the like.

In an example embodiment of the invention, apparatus 100 may be any electronic device including but not limited to a mobile phone, portable digital assistant (PDA), a pager, a mobile television, a gaming device, a camera, a video recorder, an audio player, a video player, a radio, a computer, a portable computer, a GPS device, a GPS navigation device, a GPS system, a browsing device, an electronic book reader and/or the like or any combination thereof.

Figure 1B:
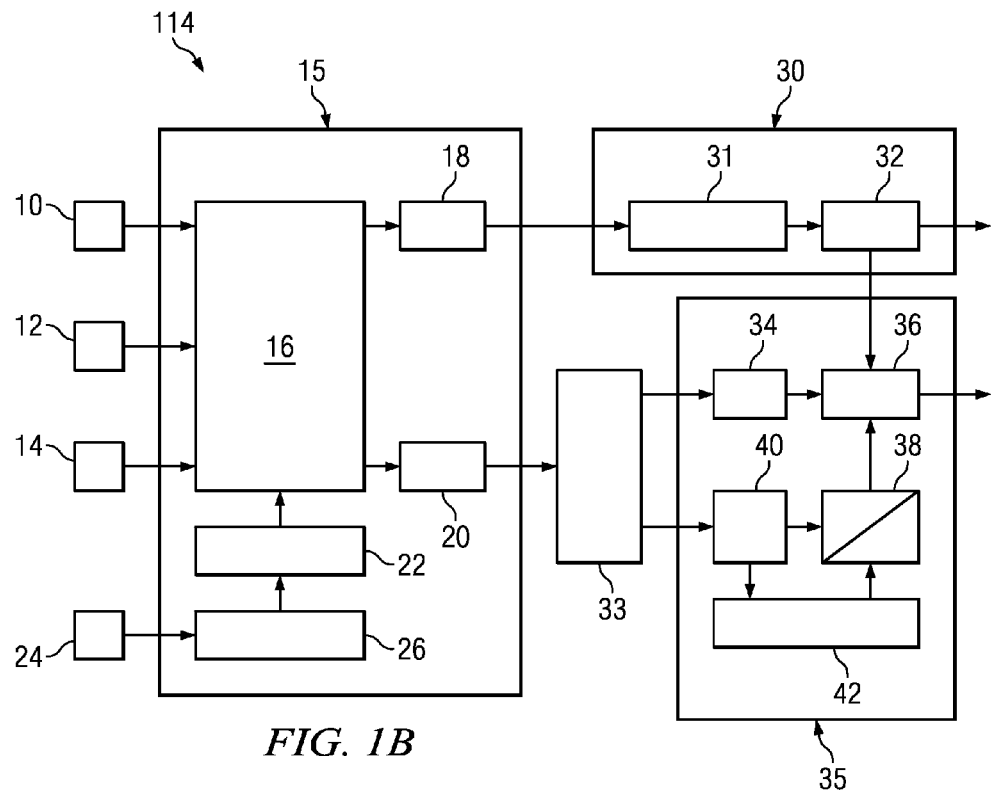
FIG. 1B is a block diagram of the motion detection unit (MDU) of FIG. 1A comprising three accelerometers according to an example embodiment of the invention.

FIG. 1B is a block diagram of MDU 114 of FIG. 1A comprising three accelerometers according to an example embodiment of the invention. The first accelerometer 10 is arranged to detect motion in the X direction. The second accelerometer 12 is arranged to detect motion in the Y direction. The third accelerometer 14 is arranged to detect motion in the Z direction. In other words, the three accelerometers 10,12 and 14 are arranged to detect motion in mutually perpendicular directions. Further description of FIG. 1B is provided infra.

Figure 1C:
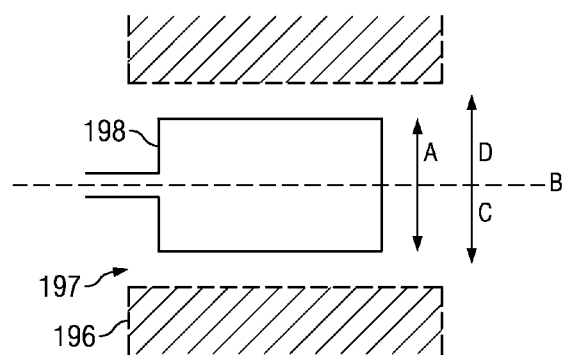
FIG. 1C is a block diagram of an example accelerometer, which may be used in FIG. 1B according to an example embodiment of the invention.

FIG. 1C is a block diagram of an example accelerometer 197, which may be used in FIG. 1B according to an example embodiment of the invention. In FIG. 1C, accelerometer 197 comprises a mass such as mass 198. Mass 198 may comprise any body of coherent matter of any shape. Accelerometer 197 is arranged to detect motion in the directions of arrow A. When there is substantially no motion of apparatus 100 of FIG. 1A in the directions of arrow A and there are substantially no external forces on mass 198 in the directions of arrow A, mass 198 will be substantially in a resting position. However, movement of apparatus 100 in the directions of arrow A, will cause mass 198 to move about the rest position indicated by dotted line B. It should be appreciated that if gravity provides a force in one of the directions of arrow A, the rest position will be above or below line B, depending on the orientation of the sensor.

Figure 1D:
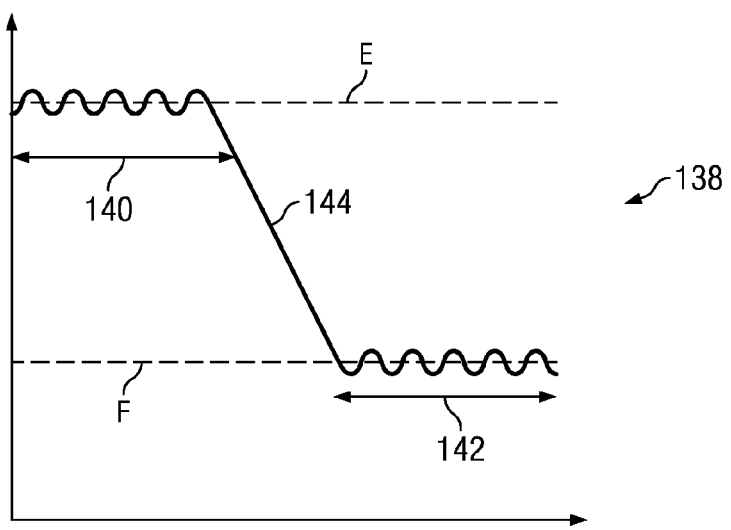
FIG. 1D is a graph showing an output of an accelerometer such as an accelerometer of FIG. 1C according to an example embodiment of the invention.

FIG. 1D is a graph 138 showing an output of an accelerometer, such as accelerometer 197 of FIG. 1C, according to an example embodiment of the invention. Accelerometer 197 of FIG. 1C is initially oriented in such a way that there is a force on mass 198 of FIG. 1C in one of the directions of arrow A due to gravity. The part of the graph 138 referenced 140 represents the condition where accelerometer 197 of FIG. 1C is in one orientation such that it is affected by gravity in one of the directions of arrow A and there is movement in at least one of the directions of arrow A. The part of the graph 138 referenced 142 shows the output of accelerometer 197 when an apparatus comprising accelerometer 197 such as apparatus 100 of FIG. 1A is in the opposite orientation so that gravity still affects accelerometer 197, but in the other direction of arrow A. This situation will likely occur if the apparatus has been rotated 180 degrees. Thus, part of graph 138 referenced 140 is where gravity acts on accelerometer 197 in the direction of arrow C. Further, part of the graph 138 referenced 142 is where gravity acts on accelerometer 197 of FIG. 1C in the direction of arrow D.

As can be seen in FIG. 1D, part of the graph referenced 140 indicates signal 144 is based about a center point represented by line E, while the part of the graph referenced 142 indicates signal 144 centered about the line F. Lines E and F provide information about the position of the apparatus such as apparatus 100 of FIG. 1A and signal 144 provides information about the amount of movement of the apparatus. It should be appreciated that depending on the orientation of the apparatus, signal 144 can be centered about different lines, which will be between lines E and F. This is because lines E and F represent the two extreme positions.

Referring back to FIG. 1B, in an example embodiment of the invention, each of the accelerometers 10-14 may provide a signal of the type shown in FIG. 1D, but for the three orthogonal directions X, Y and Z. The signals thus provide information about the position of apparatus 100 of FIG. 1A in the X, Y and Z directions as well as information about movement of apparatus 100 in the X, Y and Z directions. In an example embodiment, accelerometers such as the ADXL 202 made by Analog Devices may be used. Any other type of accelerometer may be used, which may use different techniques in order to sense gravity to provide position information and acceleration to provide movement information.

In FIG. 1B, the output of accelerometers 10-14 are input to an analog to digital converter 16, which converts the analog outputs of the accelerometers into digital signals. It should be appreciated that in alternative embodiments of the present invention, the accelerometers may provide digital outputs, in which case the analog to digital converter can be omitted. In further example embodiments, it may be possible to process the analog outputs of the accelerometer in their analog form and thus the need for the analog to digital converter can be avoided.

The operation of the accelerometers 10-14 may depend on the temperature of the environment in which apparatus 100 of FIG. 1A is located. The temperature sensor 24 thus measures the temperature inside apparatus 100. The temperature sensor 24 may take any suitable format. In FIG. 1B, the output of temperature sensor 24 is connected with an analog to digital converter 26. The output of the temperature sensor 24 may be an analog signal, which is converted by the analog to digital converter 26 to a digital signal.

The digital signal representing the temperature of apparatus 100 of FIG. 1A is input to a calibration arrangement 22. This calibration unit 22 provides a correction output, which is used to correct the digital signals representing the output of the accelerometers 10 to 14. In this way, the influence of temperature on the accelerometers may be disregarded so that a more accurate evaluation of the movement and position of apparatus 100 may be made.

The calibration unit 22 may take any suitable format. For example, the calibration unit may take the form of a look up table, with the digital output of the analog to digital converter 26 providing an address to the look up table. Alternatively, the calibration unit may perform an algorithm, which calculates the compensation required based on the output of the analog to digital converter 26. The calibration unit 22 may use a combination of an algorithm and a look up table.

The analog to digital converter 16 connected to accelerometers 10-14 provides two identical outputs. Each output contains a digital representation of each of the three outputs of the three accelerometers 10-14. One of the outputs is connected to a low pass filtering arrangement 18. The low pass filter is arranged to remove frequency components above a given cut of frequency. For example, with the signal shown in FIG. 1D, the low pass filter 18 will remove the part of the signal above line E for the part of the signal referenced 140 and will remove the part of the signal below line F for the part of the signal referenced 142. The function of the low pass filter 18 is effectively to allow the middle positions of each portion of the output from each sensor to be determined as this provides information as to the position of apparatus 100. Alternatively, a DC estimator can be used to provide orientation information. In the example shown in FIG. 1D, lines E and F are straight lines. However, it should be appreciated that depending on the motion of apparatus 100 of FIG. 1A, the line about which the signals are centered may be curved or any other possible shape.

The output of the low pass filter 18 is input to a position recognition system 30. The position recognition system 30 includes an artificial neural network (ANN) 32. The ANN 32 may be trained to identify the position of apparatus 100 of FIG. 1A based on the filtered outputs which it receives from the low pass filter 18 for each of the three accelerometers 10-14. For example, one combination of values from the three accelerometers 10-14 will be provided when apparatus 100 is lying flat on a table with its display uppermost. A different combination of outputs from the three accelerometers may be provided when apparatus 100 is in a vertical position and so on.

Any suitable type of ANN or pattern recognition unit can be used. By way of example, an ANN 32, which may be used is the self-organizing map proposed by Kohonen. Another example of an ANN is a multi layer perception neural network. This ANN is used for pattern recognition and feature extraction. In example embodiments of the invention, an ANN is able to extract information relating to the position of the apparatus 100 of FIG. 1A.

A self organizing map SOM (not shown) is a neural network which forms spatially organized feature maps from an N-dimensional input signal in an unsupervised manner. In an example embodiment of the invention, N is equal to 3 with information being provided by each of the three accelerometers 10-14. The method used by the self organizing map is similar to human sensory input mapping in the brain, which is then organized topographically. During training, weight sectors wji(n) of the network are shifted closer to the input sectors X by $$w_{ji}(n+1) = w_{ji}(n) + k(n) n_{j,1(X)}(n)(x - w_{j1}(n)).$$

where wji(n+1) is the updated weight vector, k(n) the learning rate and $n_{j,1(X)}(n)$, the neighborhood function. The learning rate and the neighborhood function are changed as the training proceeds. After self-organization, the hand labeled training data is presented to the SOM again and labels are suggested for winning neurons with their immediate neighbors. All suggestions are collected for each neuron, after which majority voting is performed for final labeling.

The three dimensional accelerometer data is normalized prior to the ANN 32, that is, the mean and variance are calculated and used for computing the normalization. A normalization block 31 can be implemented into the position recognition system 30. The normalization block 31 receives the output of the low pass filter 18 and the output of the normalization block is input to the ANN 32.

The ANN 32 is arranged to provide two functions, feature extraction and classification. Feature extraction allows the neural network to process the information, which it has received. The output is then classified so that ANN 32 determined what has occurred. In one embodiment of the present invention, the neural network 32 is trained to identify the following positions:

the apparatus 100 is in an orientation with the display upwards, the apparatus 100 is in an orientation with the display downwards, the apparatus 100 has a typical in the pocket orientation, the apparatus 100 is being pointed directly away from the user, the apparatus 100 is in an orientation on its left side, the apparatus 100 is in an orientation on its right side, the apparatus 100 is standing, and the apparatus 100 is upside down.

It should of course be appreciated that embodiments of the present invention may be used to identify a larger range of orientations of apparatus 100 or indeed any orientation of apparatus 100. In an example embodiment of the invention, the self organizing map used is a two dimensional hexagonal grid arranged to be seven neurons by seven neurons. The parameters of the self organization map are shown in table 1 below.

TABLE 1

| Parameter | Value/Argument |
| --- | --- |
| Map lattice | Hexagonal |
| Initialization type | Linear |
| Size of the map | 7 × 7 |
| Initial and final learning radiuses | [3 1] |
| Initial learning rate | 0.03 |
| Learning rate | Linear |
| Neighborhood function | epanechnikov |

The signals from the accelerometers are sampled. In an example embodiment, signals from each of the accelerometers are sampled with a frequency in a range of 20-100 Hz. The input to the low pass filter 18 starts a sequence of vectors of the following form:

$$P=[x_n y_n z_n]^T{}_1$$

where $X_n$, $Y_n$, and $Z_n$ are acceleration signals in X, Y, and Z directions at a discrete time N. In the low pass filter 18, each vector component is filtered and normalized separately. A low pass filtering is carried out using, in one embodiment of the present invention, a fourth order Butterworth filter of the type IIR. A 3-dB cut off frequency of 2.5 Hz was used in one example embodiment of the invention. The variance of each component is normalized to 1 and the mean to zero. The processed components of each vector are recombined to a sequence of 3-dimensional feature vectors $P^1{}_n$.

The feature vector $P^1{}_n$ at time N is input to a 2 dimensional feature map of the ANN 32. This produces an index $I_n$ representing the training data cluster in question. The resulting sequences of self organizing map indices $I_n$ is interpreted by the classifier which assigns a label to each index according to the training data. Each label suggests a specific gesture, movement or position of apparatus 100, for example display up etc. Finally, a majority voting is formed among the label sequence to recognize the movement of apparatus 100.

The position recognition system 30 provides two outputs. The first output provides position information for apparatus 100, which can be used as required. The second output is to a dynamic acceleration recognition system 35, which will be discussed in more detail hereinafter.

One example of an ANN is a multi layer perception network (MLP). This has three input layer neurons, ten hidden layer neurons and six output layer neurons. The network can produce position data as number sequences of six numbers. Each number can represent a different one of the positions. For example:

Display up: 001000
Display down: 100000
Device standing: 000100
Bottom up: 010000
Sideways to the left: 000001
Sideways to the right: 000010

The output of the analog to digital converter 16 connected to the outputs of the accelerometers 10-14 is also connected to a high pass filter 20. The high pass filter is arranged to remove the effects of, for example, gravity from the signal. In the case of the signal shown in FIG. 1D, the high pass filter 20 is arranged so that the first part of the signal 140 and the second part of the signal 142 are centered about a common line having a zero or similar value. If the signal is such that the center line curves, again, the signal will be filtered such that the signal is centered about a straight horizontal line at the same zero or other reference point. This is because the signals are being used to identify information relating to the movement of apparatus 100 and not its position. The output of the high pass filter 20 is input to a windowing unit 33. The windowing unit 33 receives three signals, an example of which is shown in FIG. 1E.

Figure 1E:
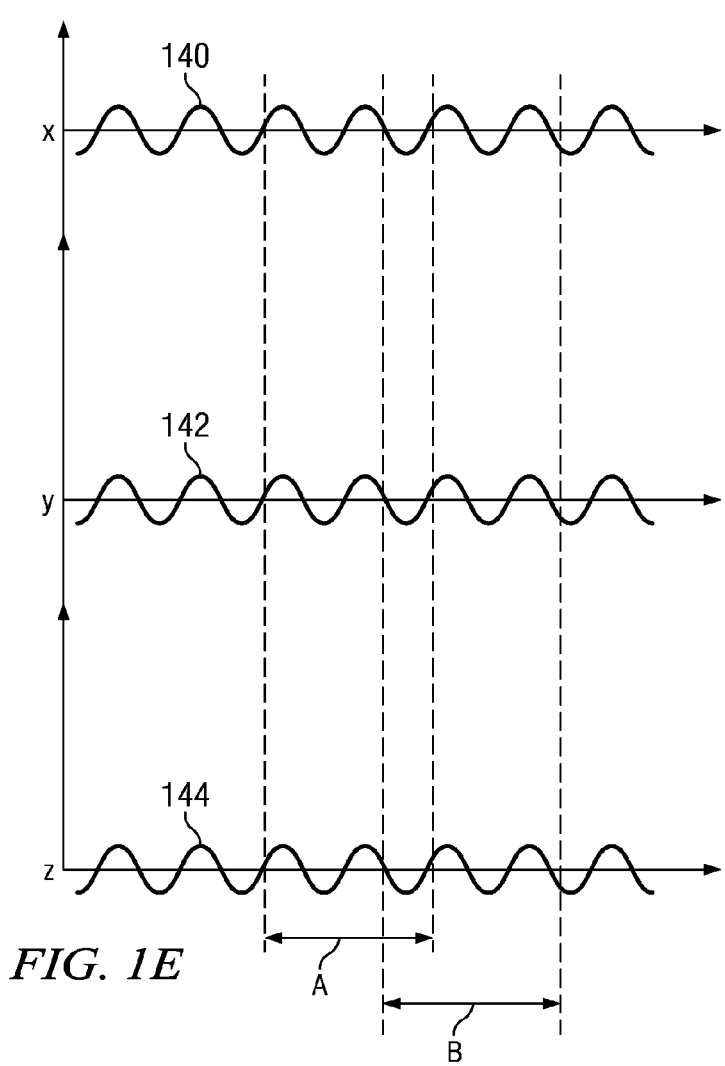
FIG. 1E is a graph showing an input of three signals to the windowing unit of FIG. 1B according to an example embodiment of the invention.

FIG. 1E is a graph showing an input of three signals to windowing unit 33 of FIG. 1B according to an example embodiment of the invention. Referring to FIG. 1E, a signal 140 represents the output of the X accelerometer 10, a second signal 142 represents the output of the Y accelerometer 12 and a third signal 144 represents the output of the Z accelerometer 14. Each of the signals is centered about a zero level. The windowing unit 33 defines a window. The signals within a window are processed together in order to obtain the required information. As can be seen from FIG. 1E, the first window shown, window A overlaps slightly with the next window, window B. It should be appreciated that all of the signals output by the high pass filter will be divided into windows for processing. The filtering may use any form of DSP filters.

Referring back to FIG. 1B, the output of windowing unit 33 is connected to the dynamic acceleration recognition system 35. One output of the windowing unit 33 is input to a first vector quantization unit 34. The vector quantization unit 34 quantizes the signals received in a given window into a plurality of vectors each having an X, Y and Z value. The values are derived from the respective X, Y and Z signals. The quantized signals are output to a second pattern recognition system 36. This system is, in example embodiments of the present invention, a hidden Markov Model (HMM) 36.

The windowing unit 33 also provides an output to a fast Fourier transform unit (FFT) 40. This FFT 40 converts the received signals from the time to the frequency domain. The output of the FFT 40 is input to a frequency peak estimate unit 42. The frequency peak estimate unit 42 identifies, for each of the X, Y and Z signals the highest frequency. The identified highest frequency for each of the X, Y and Z signals is output to a second vector quantization unit 38. Vector quantization unit 38 quantizes the output of the frequency peak estimate unit 42 and outputs it to the HMM 36. Based on the information which the neural network receives from the first and second vector quantization units 38 and from the position recognition system 30, the neural network 36 is able to identify how the mobile station is moving.

The HMM 36 is a stochastic process with an underlying process of transitions between hidden states of the system and a process of emitting observable outputs. When the outputs are discrete symbols, this is referred to as discrete HMM. The state transitions form a first order discrete Markov process with a transition probability distribution A and in an initial state distribution π. The observable process of emitting symbols can be presented as an observation symbol distribution B. Thus each HMM λ can be represented as a triplet, λA=(A, B, λ). In an example embodiment, Baum-Welch and Viterbi algorithms have been used for the training and recognition tasks. The loq-Viterbi form of the Viterbi algorithm has been used as this is economic with computational processing. Before training, the initialization of the HMM parameters were carried out as follows:

1. The initial state probability for the first state was set to 1.
2. The transition probability distribution for each state was set uniformly distributed; and
3. Any topologically allowable state transition from individual states was given probabilities of the form 1/(amount of allowable state–transitions from state).

In an example embodiment of the invention, an HMM with a left right topology is used for modeling time series whose properties change sequentially over time. In one implementation, left-right HMM models with 7 states were used. Any other type of HMM may be used in alternative embodiments of the invention.

In an example embodiment, a collection of the three dimensional acceleration data is performed with a sampling rate in a range of 20-100 Hz. As described previously, each signal from the X, Y and Z accelerometers 12-14 are separately filtered with the high pass filter 20. For example, a fourth order low pass Butterworth filter with a 3 dB cut off frequency of 4 Hz may be used. The signal was decimated at ⅙ times the original rate. The HMM 36 detects the usable signal, which is also referred to as gesture segmentation. For individual gestures, normalization of each component to a zero mean and unit variants is performed.

The vector quantization units 34 effectively act as a code book. Discrete code book indices correspond to observable symbols and are input to the HMM 36 both in the training and test phase of apparatus 100 of FIG. 1. The indices are computed by vector quantization in the first vector quantization unit 34 of the 3D input vectors of the acceleration signals from the accelerometers 10-14. In an example embodiment of the invention, the code book used by the vector quantization units is constructed by uniformly quantizing the 3D feature space. The uniform quantization is advantageous because the acceleration trajectory in the feature space can pass through any point with equal probability within the region defined by the application. The maximum values of each acceleration component was searched in the measured training data in order to define the parallelogram of activity in the feature space. In an example embodiment of the invention, the code book may be 512 3 dimensional code words. In general, the larger the size of the code book, the more accurate the recognition capability of the recognition system. Accordingly, the degree of recognition which is required will determine the size of the code book. The vector quantization carried out by both of the vector quantization units is performed in a conventional way by selecting the code book entry containing the closest code word to the input Vector in the Euclidean sense. The HMM 36 can thus be trained to recognize certain gestures or movements of apparatus 100. This will rely on a combination of information relating to the position of apparatus 100 and the movement of apparatus 100.

In an example embodiment of the invention, ANN 32 may be trained to recognize certain gestures and to control apparatus 100 accordingly. For example, instead of a number or a character, which is input to the user interface, a gesture or movement of apparatus 100 can be used. In an example embodiment, a gesture is a movement and refers to any change of position of apparatus 100 in at least one of an x-direction, a y-direction, a z-direction or rotational direction. In an example embodiment, a movement is a gesture. For example, a gesture of apparatus 100 of FIG. 1A may include the user printing or writing at least one number, letter, character, symbol or combinations of these in the air or against a surface. Using the position and movement neural networks, the HMM 36 is able to recognize when the user performs a predetermined movement or gesture and provide an indication to processor 102 of FIG. 1A when a particular predetermined gesture has been detected. It should be appreciated that the neural network is able to identify a gesture from the movement of apparatus 100 of FIG. 1A and the position of apparatus 100 over a period of time. Using the position and movement neural networks, HMM 36 is also able to recognize when a user points or moves apparatus 100 in a particular direction with respect to the user, such as directly in front of the user, to the front-left of the user, or the front-right of the user. In an example embodiment, it should be appreciated that the gestures can be made by a user in one dimension, such as a line, in two dimensions, such as a circle, or in three dimensions such as a three orthogonal lines.

In an example embodiment of the invention, a user may train ANN 32 to recognize particular gestures by repeating the gesture a number of times. The ANN 32 will then learn to recognize the predetermined gesture when the user performs the gesture in the future. In an example embodiment, apparatus 100 will be sold with at least a partly trained ANN 32 to recognize at least one predetermined gesture. In an alternate embodiment, a user may provide at least some training to ANN 32 residing on apparatus 100. In an example embodiment, training ANN 32 comprises logging accelerometer data on apparatus 100 during a gesture, sending the accelerometer data to a network server, which carries out the required training and sending ANN 32 source code to apparatus 100 from the server. A neural network may be trained so as to take into account the speed at which a gesture is formed and only to recognize a particular gesture if the timing is similar to previously stored gesture.

Figure 2A:
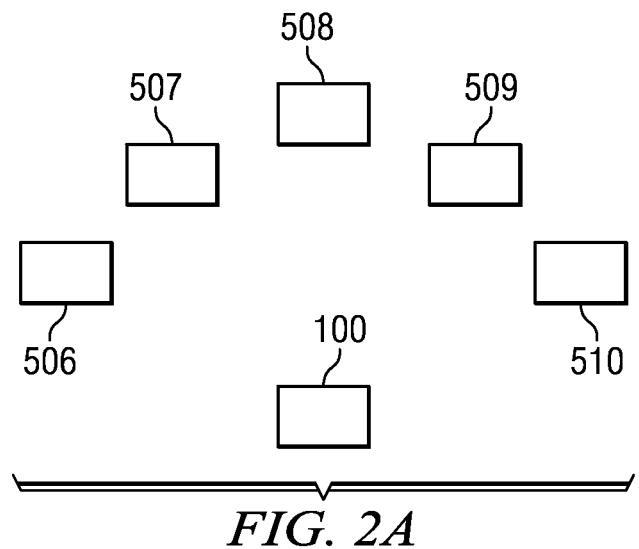
FIG. 2A is a diagram of the apparatus of FIG. 1A and a group of five receivers according to an example embodiment of the invention.

FIG. 2A is a diagram of apparatus 100 of FIG. 1A and a group of five receivers 506-510 according to an example embodiment of the invention. In FIG. 2A, each receiver of receivers 506-510 may be any electronic device such as but not limited to a portable digital assistant (PDA), a pager, a mobile phone, a mobile television, a gaming device, a camera, a video recorder, an audio player, a video player, a radio, a mobile telephone, a traditional computer, a portable computer device, a GPS device, a GPS navigation device, a GPS system, a mobile computer, a browsing device, an electronic book reader, a printer, a scanner, a facsimile machine and/or the like or a combination thereof. In an example embodiment, receivers 506-510 comprise Bluetooth™ capability. In another example embodiment, receivers 506-510 comprise WLAN capability. In an example embodiment, a user may provide a predetermined gesture and/or a predetermined gesture in a particular direction using apparatus 100 to select at least one receiver.

Figure 2B:
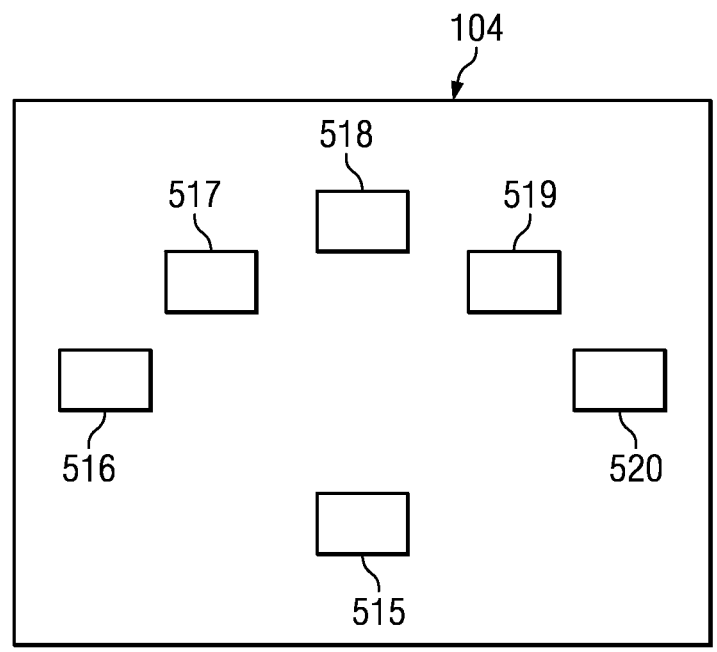
FIG. 2B is a screen view showing an arrangement of receiver display representations and an apparatus display representation on a display of the apparatus of FIG. 1A according to an example embodiment of the invention.

FIG. 2B is a screen view showing an arrangement of receiver display representations 516-520 and an apparatus display representation 515 on a display 104 of apparatus 100 of FIG. 1A according to an example embodiment of the invention. Receiver display representations 516-520 corresponding to receivers 506-510 of FIG. 2A may be in the form of an icon or other graphic appearing on display 104. A processor such as processor 102 of FIG. 1A may allow a user of apparatus 100 of FIG. 1A to associate a unique identifier with each receiver display representation 516-520 such as but not limited to at least one character, number, symbol or combinations thereof.

Figure 2C:
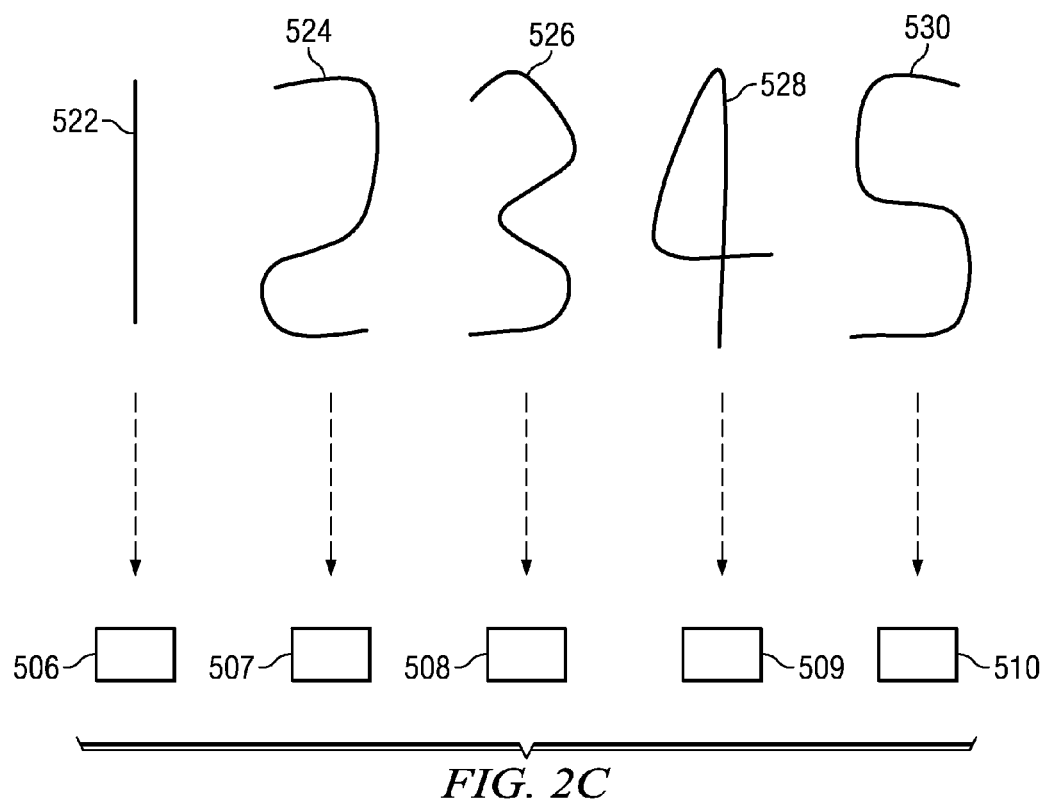
FIG. 2C is a representation of an association of forms to receivers according to an example embodiment of the invention.

FIG. 2C is a representation of an association of forms to receivers according to an example embodiment of the invention. In FIG. 2C, forms 522-530 each represent a movement of an apparatus such as apparatus 100 in the air, against a wall, against a table and/or the like. For example, a processor such as processor 102 of FIG. 1A or an ANN such as ANN 32 of FIG. 1B may associate form 522 of FIG. 2C, which resembles a "1" with receiver 506. Further, form 524, which resembles a "2" may be associated with receiver 507, and so on. Further, a predetermined movement of apparatus 100 of FIG. 1A may comprise a directional movement of apparatus 100. A directional movement of apparatus 100 may be a pointing gesture, a swing, a flick or a throwing motion in a general direction of a receiver such as 506-510 of FIG. 2A. In an example embodiment, a relatively simple movement of apparatus 100 resembling a single digit such as a character, number, symbol or combination thereof, which allows a user to select a receiver is an intuitive and powerful way of selecting that will likely significantly enhance a user's experience.

Figure 3:
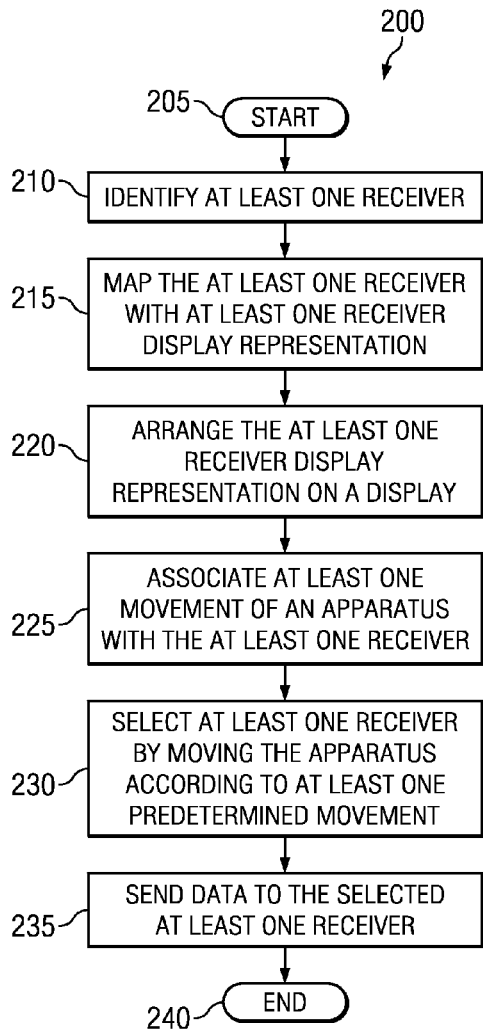
FIG. 3 is a flow diagram illustrating an example method for selecting at least one receiver by moving an apparatus such as the apparatus of FIG. 1A according to at least one predetermined movement according to an example embodiment of the invention.

FIG. 3 is a flow diagram 200 illustrating an example method for selecting at least one receiver by moving an apparatus such as apparatus 100 of FIG. 1A according to at least one predetermined movement according to an example embodiment of the invention. At 205, the example method begins. At 210, at least one receiver is identified. In an example embodiment, a receiver is identified by apparatus 100 of FIG. 1A using any wireless technology such as but not limited to WLAN or Bluetooth™. For example, apparatus 100 may comprise a network interface 126 that includes Bluetooth™ capability. Similarly, at least one receiver such as receivers 506-510 of FIG. 2A located within range of apparatus 100 of FIG. 1A may comprise Bluetooth™ capability. Apparatus 100 may transmit a wireless signal to perform an inquiry to identify receivers in which to connect. Receivers 506-510 may respond to the inquiry from apparatus 100 by transmitting their attributes such as a device name and a list of available services.

At 215, at least one identified receiver such as at least one of receivers 506-510 of FIG. 2A is mapped with at least one receiver display representation such as at least one of receiver display representations 516-520 of FIG. 2B. For example, a processor such as processor 102 may receive a device name and a list of available services from each receiver 506-510 of FIG. 2A and generate corresponding receiver display representations 516-520 on display 104 of FIG. 1A. Display representations 516-520 corresponding to receivers 506-510 may be in the form of an icon or other graphic appearing on display 104. Display representations 516-520 may each indicate a unique identifier such as a name that a user may use to associate each receiver with a corresponding display representation.

At 220, at least one receiver display representation is arranged on a display such as display 104 of FIG. 1A. In an example embodiment, receiver display representations 516-520 of FIG. 2B and apparatus 100 display representation 515 of FIG. 2B are arranged by a processor such as processor 102 on display 104 of FIG. 1A to approximate relative locations of receivers 506-510 as in FIG. 2A. For example, in FIG. 2B, receiver display representations 516-520 each correspond to receivers 506-510 of FIG. 2A, respectively.

At 225, at least one movement of an apparatus such as apparatus 100 of FIG. 1A is associated with at least one receiver such as at least one receiver in 506-510 of FIG. 2A. In an example embodiment, a movement or gesture of apparatus 100 includes the user printing, writing or otherwise moving apparatus 100 to approximate a form in the air or against a surface such as a wall or table. A form may include at least one number, letter, character, symbol or combination thereof. In an example embodiment, a processor such as processor 102 of FIG. 1A or an ANN such as ANN 32 of FIG. 1B associates a movement of apparatus 100 with at least one receiver of receivers 506-510 by automatically assigning a unique movement to each receiver. Further, once the association is made, processor 102 of FIG. 1A or ANN 32 of FIG. 1B may store the association in a memory of apparatus 100, such as volatile memory 110 of FIG. 1A or non-volatile memory 112 of FIG. 1A. In an example embodiment, processor 102 or ANN 32 may automatically display a form describing at least one movement of an apparatus on a display such as display 104 of FIG. 1A adjacent to an associated receiver display representation to provide an indication of an association to the user of an apparatus. For example, display 104 may be a near-eye-display in a mixed, virtual or augmented reality environment and processor 102 or ANN 32 may display at least one form on the display adjacent to one or more receiver display representations, which may represent objects in a user's environment that the user may communicate with. In an alternate embodiment, processor 102 or ANN 32 allows a user to manually associate movements to receivers.

In an example embodiment, a processor such as processor 102 of FIG. 1A or an ANN such as ANN 32 of FIG. 1B may associate a directional movement of apparatus 100 of FIG. 1A with an arrangement of receiver display representations such as receiver display representations 516-520 of FIG. 2B on display 104 of FIG. 1A. For example, a predetermined movement of apparatus 100 resembling a curved or swinging motion of apparatus 100 from a twelve o'clock position to a nine o'clock position may be associated with receiver 506 of FIG. 2A. Further, since receiver 506 may be mapped at step 215 of FIG. 3 with receiver display representation 516 of FIG. 2B simulating the approximate relative location of receiver 506 with respect to the other receivers of FIG. 2A, a processor such as processor 102 or ANN 32 may associate this directional movement from a twelve o'clock position to a nine o'clock position with receiver 506.

At 230, a user may select at least one receiver by moving an apparatus such as apparatus 100 of FIG. 1A according to at least one predetermined movement. For example, a user may move apparatus 100 according to at least one predetermined movement, which corresponds to a form or a directional movement as described supra. In an example embodiment, if a movement is detected by ANN 32 of FIG. 1B, ANN 32 will determine whether the user's movement of apparatus 100 corresponds with a predetermined movement. Further, if a user's movement of apparatus 100 of FIG. 1A corresponds with a predetermined movement, ANN 32 may provide an indication of the associated receiver to a processor such as processor 102 of FIG. 1A as determined in step 225 of FIG. 3, which corresponds to the user's selection.

At 235, data is sent to the at least one selected receiver. For example, any form of data may be sent to a receiver selected by the user such as but not limited to a single byte, a file, an image, a video, an email and/or the like. In an example embodiment, data sent to the at least one selected receiver comprises a business card belonging to the user of apparatus 100 of FIG. 1A. Further, data sent to at least one selected receiver may be part of an exchange of data required to form a connection between apparatus 100 of FIG. 1A and one of receivers 506-510, such as a Bluetooth™ connection or a WLAN connection. At 240, the example method ends.

Figure 4:
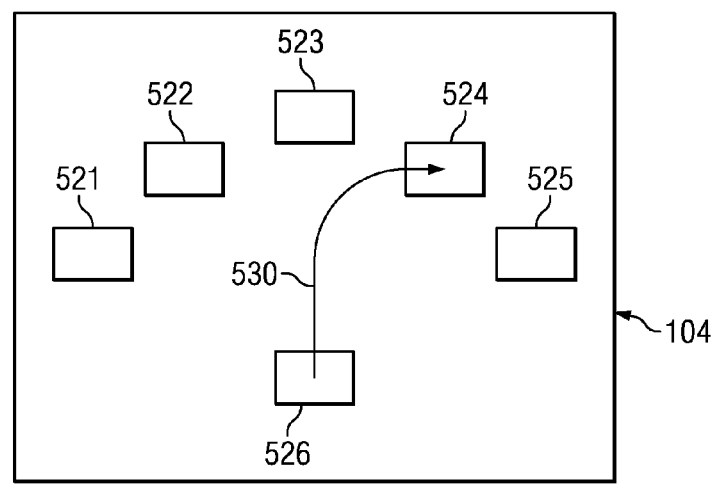
FIG. 4 is a screen view showing an arrangement of receiver display representations and a mark on a display of the apparatus of FIG. 1A according to an example embodiment of the invention.

FIG. 4 is a screen view showing an arrangement of receiver display representations such as receiver display representations 521-525 and a mark 530 on display 104 of apparatus 100 of FIG. 1A according to an example embodiment of the invention. In an example embodiment, receiver display representations 521-525 correspond to receivers 506-510 of FIG. 1A. Further, receiver display representations 521-525 may be in the form of an icon or other graphic appearing on display 104. A processor such as processor 102 of FIG. 1A may allow a user of apparatus 100 to associate a unique identifier with each receiver display representation 521-525 such as but not limited to at least one character, number, symbol or combinations thereof.

Figure 5:
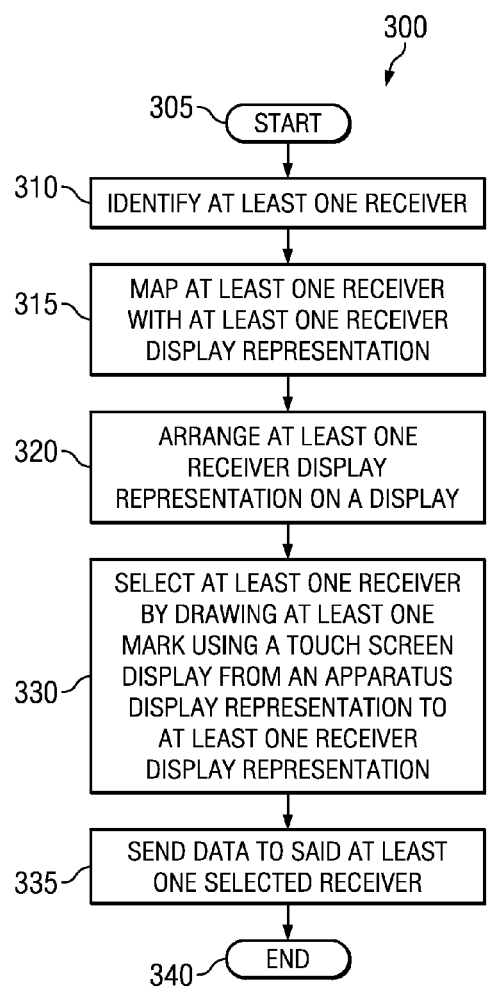
FIG. 5 is a flow diagram illustrating an example method for selecting at least one receiver by drawing a mark using a display according to an example embodiment of the invention.

FIG. 5 is a flow diagram illustrating an example method 300 for selecting at least one receiver by drawing a mark using a display such as display 104 of apparatus 100 of FIG. 1A according to an example embodiment of the invention. At 305, the method begins. At 310, at least one receiver is identified. In an example embodiment, at least one receiver such as at least one receiver of receivers 506-510 of FIG. 2A is identified by apparatus 100 of FIG. 1A using any wireless technology such as but not limited to WLAN or Bluetooth™. For example, apparatus 100 may comprise a network interface 126 of FIG. 1A that includes Bluetooth™ capability. Further, receivers 506-510 of FIG. 2A located within range of apparatus 100 of FIG. 2A may comprise Bluetooth™ capability. In an example embodiment, apparatus 100 of FIG. 2A transmits a wireless signal to perform an inquiry to identify receivers in which to connect. Further, receivers 506-510 of FIG. 2A may respond to the inquiry from apparatus 100 by transmitting their attributes such as a device name and a list of available services.

At 315, at least one identified receiver 506-510 of FIG. 2A is mapped with at least one receiver display representation 521-525 of FIG. 4. For example, a processor such as processor 102 may receive a device name and a list of available services from each receiver 506-510 of FIG. 2A and generate a corresponding receiver display representation 521-525 for each receiver on display 104 of FIG. 1A. Display representations 521-525 of FIG. 4 corresponding to receivers 506-510 of FIG. 2A may be in the form of an icon or other graphic appearing on display 104 of FIG. 1A. Display representations 521-525 of FIG. 4 may each indicate a unique identifier such as a name that a user may use to associate each receiver with a corresponding display representation.

At 320, at least one of receiver display representation 521-525 of FIG. 4 is arranged on display 104 of FIG. 1A. Receiver display representations 521-525 and apparatus 100 display representation 526 of FIG. 4 may be arranged by a processor such as processor 102 of FIG. 1A on display 104 of FIG. 1A to approximate relative locations of receivers 506-510 and apparatus 100 as in FIG. 4 as compared with FIG. 2A. For example, receiver display representations 521-525 and apparatus display representation 526 of FIG. 4 each correspond to receivers 506-510 and apparatus 100 of FIG. 2A, respectively.

At 330, at least one receiver is selected by a user of apparatus 100 of FIG. 1A by drawing a mark 530 using a display such as display 104 of FIG. 1A. In an example embodiment, display 104 is a touch screen display. In an example embodiment, a user may draw a mark from apparatus 100 display representation 526 of FIG. 4 to a receiver display representation indicating that processor 102 of FIG. 1A should send data from apparatus 100 through interface 126 of FIG. 1A to at least one receiver such as receivers 516-520 of FIG. 2A. In an example embodiment, more than one mark may be drawn from apparatus 100 display representation 526 of FIG. 4 to more than one receiver display representation to indicate that a processor should perform multiple data transfers.

At 335, data is sent from apparatus 100 of FIG. 1A to the at least one selected receiver of receivers 516-520 of FIG. 2A. At 335, any form of data may be sent to at least one receiver, which was selected by the user in 330 such as but not limited to a single byte, a request for a file download, a file, an image, a video, an email and/or the like. Further, data sent to at least one selected receiver may be part of an exchange of data required to form a connection between apparatus 100 and at least one of receivers 516-520, such as a Bluetooth™ connection or a WLAN connection. At 340, the example method ends.

Without in any way limiting the scope, interpretation, or application of the claims appearing below, a technical effect of one or more of the example embodiments disclosed herein is to select a receiver by moving an apparatus according to a predetermined movement or gesture in a 2-dimensional or 3-dimensional space. Another technical effect of one or more of the example embodiments disclosed herein is to select a receiver by drawing at least one mark on a touch screen display from an apparatus display representation to at least one receiver display representation.

Embodiments of the present invention may be implemented in software, hardware, application logic or a combination of software, hardware and application logic. The software, application logic and/or hardware may reside on volatile memory or non-volatile memory. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 1A. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   identifying at least one receiver;
   associating a stored representation of at least one predetermined movement of an apparatus with said at least one receiver, each said at least one predetermined movement being a physical motion of said apparatus in at least one of an x, y and z direction;
   selecting said at least one receiver by detecting movement of said apparatus corresponding to said stored representation of said at least one predetermined movement;
   sending data to said selected at least one receiver; and
   mapping at least one receiver with at least one receiver display representation.

2. A method according to claim 1, further comprising arranging said at least one receiver display representation on a display.

3. A method according to claim 2, wherein said arranging is based at least in part on at least one receiver location.

4. A method according to claim 2, further comprising detecting a user gesture movement of the apparatus to detect said at least one predetermined movement of said apparatus; and wherein said at least one receiver is selected depending on the detected user gesture movement.

5. A method according to claim 1, wherein said at least one predetermined movement of said apparatus is toward a direction of said at least one receiver.

6. A method according to claim 1, wherein associating comprises associating said at least one predetermined movement of the apparatus with said at least one receiver, wherein said at least one predetermined movement corresponds to at least one form, wherein said form corresponds with at least one of a number, letter, character, symbol and combination thereof.

7. A method according to claim 1, wherein said identifying utilizes a wireless local area network protocol or near field communications protocol.

8. A method according to claim 1, wherein said apparatus and each said at least one receiver are each one of a PDA, a pager, a mobile phone, a mobile television, a gaining device, a camera, a video recorder, audio player, a video player, a radio, a traditional computer, a portable computer, a GPS device, a browsing device, an electronic book reader, a printer, a scanner, a facsimile machine and a combination thereof.

9. A method, comprising:
identifying at least one receiver;
displaying on a display of an apparatus a receiver display representation of said at least one receiver and an apparatus display representation of said apparatus;
selecting at least one receiver by drawing at least one mark using said display from said apparatus display representation of said apparatus to said receiver display representation of said at least one receiver; and
sending data to said selected at least one receiver.

10. A method according to claim 9, further comprising mapping a plurality of receivers with a respective receiver display representation; and wherein displaying includes displaying each said respective receiver display representation.

11. A method according to claim 10, further comprising arranging each said respective receiver display representation based at least in part on a location of each receiver of said plurality of receivers relative to at least one of said apparatus and other receivers of said plurality of receivers.

12. A method according to claim 9, wherein said identifying utilizes a wireless local area network protocol or near field communication protocol.

13. A method according to claim 9, wherein said mark corresponds generally to at least one of a line, a curve or a shape.

14. A method according to claim 9, wherein said apparatus and each said at least one receiver are each one of a PDA, a pager, a mobile phone, a mobile television, a gaming device, a camera, a video recorder, audio player, a video player, a radio, a traditional computer, a portable computer, a GPS device, a browsing device, an electronic book reader, a printer, a scanner, a facsimile machine and a combination thereof.

15. An apparatus, comprising:
at least one motion sensor;
at least one processor;
a display, wherein said at least one processor is configured to enable a user to arrange at least one receiver display representation on said display; and
at least one memory including computer program code, the at least one memory and the computer program code configured with the at least one processor and the at least one motion sensor to cause the apparatus to perform at least the following:
identify at least one receiver;
receive an indication of movement of said apparatus from said at least one motion sensor;
associate a stored representation of at least one predetermined movement of said apparatus with said at least one receiver, each said at least one predetermined movement being a physical motion of the apparatus in at least one of an x, y and z direction;
select at least one receiver based at least in part on said indication of movement of said apparatus and said stored at least one predetermined movement associated with said at least one receiver; and
send data to said selected at least one receiver.

16. An apparatus according to claim 15, wherein said predetermined movement associated with said at least one receiver corresponds to at least one of a number, letter, character, symbol and a combination thereof.

17. An apparatus according to claim 15, wherein said at least one motion sensor comprises at least one accelerometer.

18. An apparatus according to claim 15, wherein said apparatus is at least one of an electronic device, mobile phone, gaming device, mobile computer, and a navigation device.

19. An apparatus according to claim 15, wherein said apparatus and each said at least one receiver are each one of a PDA, a pager, a mobile phone, a mobile television, a gaming device, a camera, a video recorder, audio player, a video player, a radio, a traditional computer, a portable computer, a GPS device, a browsing device, an electronic book reader, a printer, a scanner, a facsimile machine and a combination thereof.

20. An apparatus, comprising:
at least one motion sensor for detecting movement of an apparatus;
storing means for storing data representing a predetermined movement of said apparatus, said predetermined movement of said apparatus being associated with a receiver, said predetermined movement being a physical motion of said apparatus in at least one of an x, y and z direction;
at least one processor; and
a display for displaying a display representation of said receiver and a display representation of said apparatus;
said apparatus configured to detect said receiver;
said processor coupled with said at least one motion sensor; and
said processor configured to receive signals representative of detected movement of said apparatus and configured to send data to said receiver based at least in part upon said received signals representative of said detected movement of said apparatus and said stored data representing a predetermined movement of said apparatus associated with said receiver.

21. An apparatus according to claim 20, wherein said predetermined movement of said apparatus associated with said receiver corresponds to at least one of a number, letter, character, symbol and a combination thereof.

22. An apparatus according to claim 20, wherein said motion sensor is coupled through said processor to said display, and wherein said detected movement of said apparatus is a gesture in a direction of said display representation of said receiver relative to said display representation of said apparatus as displayed on said display.

23. An apparatus according to claim 20, wherein said processor is further configured to enable a user to arrange said display representation of said receiver on said display.

24. An apparatus according to claim 20, wherein said motion sensor comprises at least one accelerometer.

25. An apparatus according to claim 20, wherein said apparatus is configured to detect a plurality of receivers and said processor is configured to send data to a selected at least one of said plurality of receivers based at least in part upon said received signals representative of said detected movement of said apparatus and said stored data representing a predetermined movement of said apparatus associated with said selected at least one of said plurality of receivers.

26. An apparatus according to claim 20, wherein said apparatus and each said at least one receiver are each one of a PDA, a pager, a mobile phone, a mobile television, a gaming device, a camera, a video recorder, audio player, a video player, a radio, a traditional computer, a portable computer, a GPS device, a browsing device, an electronic book reader, a printer, a scanner, a facsimile machine and a combination thereof.

* * * * *